United States Patent
Vänttinen et al.

(10) Patent No.: US 7,151,941 B2
(45) Date of Patent: Dec. 19, 2006

(54) LOCATION OF SUBSCRIBER TERMINAL IN PACKET-SWITCHED RADIO SYSTEM

(75) Inventors: Veijo Vänttinen, Espoo (FI); Ville Ruutu, Espoo (FI)

(73) Assignee: Nokia Mobile Phones, Ltd, Espoo (FI)

( * ) Notice: Subject to any disclaimer, the term of this patent is extended or adjusted under 35 U.S.C. 154(b) by 888 days.

(21) Appl. No.: 09/771,464

(22) Filed: Jan. 26, 2001

(65) Prior Publication Data

US 2001/0009544 A1    Jul. 26, 2001

(30) Foreign Application Priority Data

Jan. 26, 2000   (FI) .................................. 20000150

(51) Int. Cl.
*H04Q 7/20* (2006.01)
*H04L 12/66* (2006.01)
*H04B 7/00* (2006.01)

(52) U.S. Cl. .............................. 455/456.2; 455/456.5; 370/310; 370/352

(58) Field of Classification Search ................ 370/312, 370/316, 328, 329, 332, 352, 400, 401, 431, 370/432, 331, 410, 426, 338; 455/456, 457, 455/450, 445, 422.1, 404.2, 412.1, 456.1, 455/456.2, 403, 456.6, 423, 436, 440
See application file for complete search history.

(56) References Cited

U.S. PATENT DOCUMENTS

| | | | |
|---|---|---|---|
| 6,285,667 B1* | 9/2001 | Willars et al. ............... | 370/329 |
| 6,321,257 B1* | 11/2001 | Kotola et al. ................ | 709/219 |
| 6,330,454 B1* | 12/2001 | Verdonk ................... | 455/456.2 |
| 6,389,008 B1* | 5/2002 | Lupien et al. ............... | 370/352 |
| 6,600,920 B1* | 7/2003 | Stephens et al. ......... | 455/432.1 |
| 6,748,320 B1* | 6/2004 | Jones ......................... | 701/201 |
| 6,801,782 B1* | 10/2004 | McCrady et al. ........... | 455/517 |

FOREIGN PATENT DOCUMENTS

| | | |
|---|---|---|
| WO | WO 96/25830 | 8/1996 |
| WO | WO 99/37114 | 7/1999 |
| WO | WO 00/25545 | 5/2000 |
| WO | WO 00/35236 | 6/2000 |
| WO | WO 00/69199 | 11/2000 |
| WO | WO 00/76171 A1 | 12/2000 |

OTHER PUBLICATIONS

3G TS 23.171 V1.0.0 (Oct. 1999); 3rd Generation Partnership Project; Technical Specification Group Services And System Aspects.

* cited by examiner

*Primary Examiner*—Hanh Nguyen
(74) *Attorney, Agent, or Firm*—Perman & Green, LLP (57) ABSTRACT

The invention relates to a packet-switched radio system and to a method of locating a subscriber terminal in a packet-switched radio system. In the method (302) the core network of the radio system transmits a location service request message to the radio network of the radio system; (304) the radio network transmits information to a subscriber terminal in a paging message that the subscriber terminal is requested to initiate the location service; (306) the subscriber terminal that received the paging message transmits a paging response message to the radio network; (308) the radio network transmits the paging response message to the core network; (310) the network part locates the subscriber terminal on the basis of the information included in the paging response message.

26 Claims, 7 Drawing Sheets

LOCATION OF SUBSCRIBER TERMINAL IN PACKET-SWITCHED RADIO SYSTEM

FIELD

The invention relates to a method of performing a function of the subscriber terminal location service in a packet-switched radio system, and to a packet-switched radio system employing the method.

BACKGROUND

Location of a subscriber terminal, i.e. determination of the geographical location of a subscriber terminal, is an important function in cellular radio networks. In the United States a federal authority (Federal Communication Commission FCC) requests that one should be able to locate all subscriber terminals that make emergency calls even with accuracy of 50 meters. Location can also be used for commercial purposes, e.g. for defining various tariff areas or for implementing a navigation service which guides the user. So far the location service (LCS) has been mainly developed for circuit-switched cellular radio networks, such as the GSM system (Global System Mobile Communications).

Various methods are used for implementing the location service. At the least accurate level the location of a subscriber terminal can be determined on the basis of the identity of the cell that serves the subscriber terminal. This does not provide very accurate information because the diameter of a cell can be dozens of kilometers.

A more accurate result is obtained by using timing information on the radio connection as additional information, e.g. the timing advance TA. In the GSM system the TA provides the location of a subscriber terminal with accuracy of approximately 550 meters. The problem is that if the cell is implemented with an omnidirectional antenna, the location of a subscriber terminal with respect to a base station is known only on the circumference drawn around the base station. A base station divided into three sectors, for example, slightly improves the situation, but even in that case it can only be determined that the subscriber terminal is located in a 120° sector in an area with a depth of 550 meters at a certain distance from the base station.

These inaccurate methods are adequate for some applications, e.g. for determining tariff areas. More accurate methods have also been developed. These methods are usually based on various base stations measuring a signal transmitted by a subscriber terminal. One example of such methods is the TOA method (Time of Arrival).

The subscriber terminal can also measure signals transmitted by various base stations. An example of such a method is the E-OTD method (Enhanced Observed Time Difference). In synchronized networks the subscriber terminal measures the ratios between the reception moments of the signals it has received from different base stations. In non-synchronized networks the signals transmitted by the base stations are also received by a location measurement unit LMU placed at a known and fixed measurement point. The location of the subscriber terminal is determined on the basis of geometrical components obtained from time delays.

Another location method is to use a GPS receiver (Global Positioning System) arranged in a subscriber terminal. The GPS receiver receives a signal transmitted by at least four earth-orbiting satellites, and the latitude, longitude and altitude of the location of the subscriber terminal can be calculated on the basis of these signals. The subscriber terminal either determines the location independently or it is assisted in the determination. The network part of the radio system may send an assistance message to the subscriber terminal, which speeds up the location process, i.e. the power consumption of the subscriber terminal decreases. The assistance message may contain the time, a list of visible satellites, Doppler shift of the satellite signal and a search window for the code phase. The subscriber terminal can send the information it has received to the network part, in which the location is calculated. In this application the network part of the radio system refers to the fixed part of the radio system, i.e. to the whole system except for the subscriber terminal.

In packet-switched radio systems, like in the GPRS (General Packet Radio Service) or in the EGPRS (Enhanced General Packet Radio Service), very little attention has been paid to the implementation of the location service. The EGPRS is a GSM-based (Global System for Mobile Communications) system which utilizes packet-switched transmission. The EGPRS employs the EDGE (Enhanced Data Rates for GSM Evolution) technique for increasing the data transmission capacity. In addition to the GMSK modulation (Gaussian Minimum-Shift Keying) normally used in the GSM, the 8-PSK modulation (8-Phase Shift Keying) can also be applied to packet data channels. The main object is to provide non-real-time data transmission services, such as copying of files and use of an Internet browser, but also packet-switched real time services for transmission of speech and video, for example.

In packet-switched radio systems the location methods described above-require a packet-switched transmission connection between the core network of the radio system and the subscriber terminal for transmitting the necessary information. The signaling traffic needed is rather heavy and slow. In time critical applications it would, however, be important to receive the location of the subscriber terminal fast from the location service.

BRIEF DESCRIPTION OF THE INVENTION

An object of the invention is to provide an improved method of performing a function of the subscriber terminal location service in a packet-switched radio system. According to an aspect of the present invention, there is provided a method of claim 1 of locating a subscriber terminal in a packet-switched radio system. According to another aspect of the present invention, there is provided a packet-switched radio system of claim 18. The preferred embodiments of the invention are disclosed in the dependent claims.

The invention is based on adding information needed by a function of the location service to a request message or to a new response message.

Several improvements are achieved with the method and apparatus of the invention: the location method becomes faster, in certain cases no packet-switched transmission connection needs to be established at all, and the amount of signaling needed decreases.

BRIEF DESCRIPTION OF THE DRAWINGS

The invention will be described in greater detail by means of preferred embodiments with reference to the accompanying drawings, in which.

DESCRIPTION OF EMBODIMENTS

The typical structure of a packet-switched radio system and its connections to a public switched telephone network and packet transmission network will be described with reference to FIGS. 1A and 1B. FIG. 1B includes only the blocks necessary for describing the embodiments, but it is clear to a person skilled in the art that a conventional packet-switched cellular radio network also comprises other functions and structures that need not be described in greater detail here. The radio system may be e.g. the GSM-based GPRS or EGPRS system, the universal mobile telephone system UMTS, which utilizes the wideband code division multiple access method, or an intermediate form of these systems, in which the structure of the radio network is similar to that of the UMTS and which is called e.g. GERAN (GSM Enhanced Radio Access Network). In such a system the radio interface is, however, a normal GSM-based radio interface or a radio interface which uses EDGE modulation.

Figure 1A:
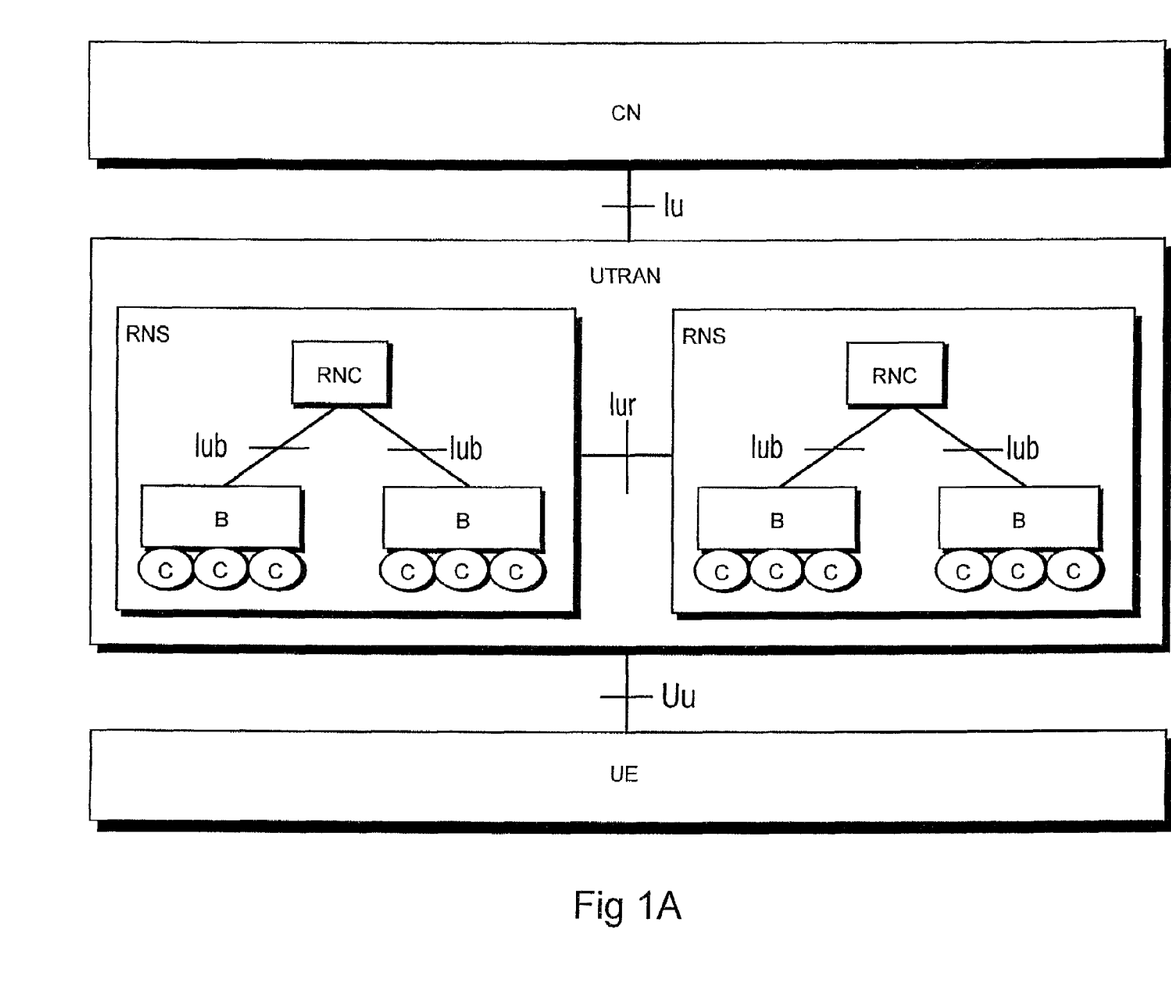
FIG. 1A shows an example of the structure of a cellular radio network.
Figure 1B:
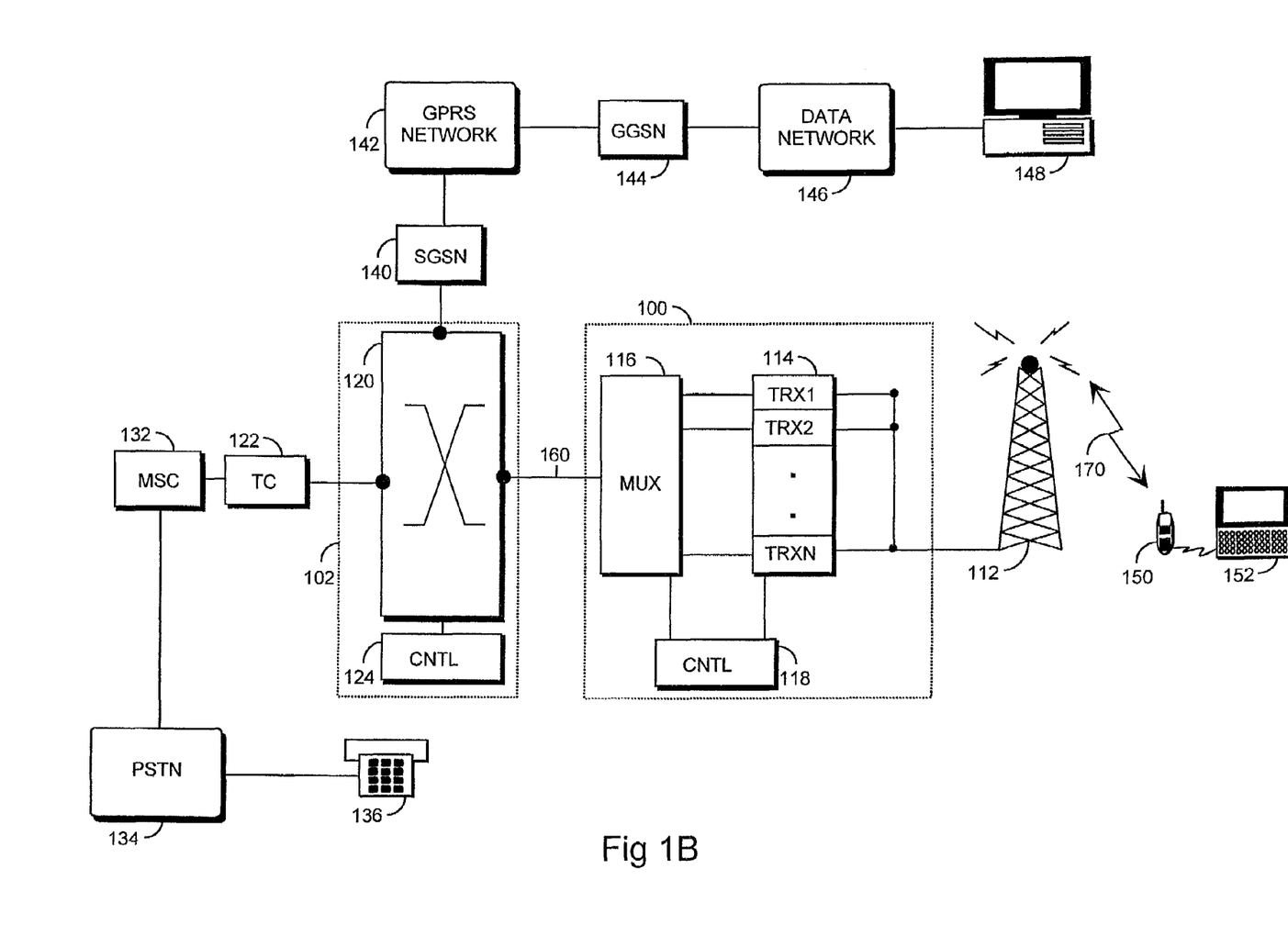
FIG. 1B is a block diagram illustrating the cellular network in greater detail.

The description of FIGS. 1A and 1B is mainly based on the UMTS. The main parts of the mobile communications system are a core network CN, an UMTS terrestrial radio access network, i.e. the radio network UTRAN, and user equipment UE. The interface between the CN and the UTRAN is called Iu, and the air interface between the UTRAN and the UE is known as Uu.

The UTRAN consists of radio network subsystems RNS. The interface between the RNSs is called Iur. The RNS consists of a radio network controller RNC, and of one or more B nodes. The interface between the RNC and the B is called Iub. The coverage area of the B node, i.e. a cell, is marked with C is FIG. 1B. The more conventional name, i.e. base station system BSS, can also be used for the RNS. The network part of the radio system thus comprises the radio network UTRAN and the core network CN.

The illustration of FIG. 1A is very abstract, and thus it is specified in FIG. 1B by showing which part of the GSM system approximately corresponds to which part of the UMTS. It should be noted that the description is not limiting but only indicative because the responsibilities and functions of the different parts of the UMTS are still under design.

The subscriber terminal 150 may be fixed, placed in a vehicle or a portable terminal. The infrastructure of the radio network UTRAN consists of radio network subsystems RNS, i.e. base station systems. The radio network subsystem RNS consists of radio network controllers RNC, i.e. of a base station controller 102 and of at least one B node, i.e. a base station 100, controlled by it.

The base station B contains a multiplexer 116, transceivers 114 and a control unit 118, which controls the function of the transceivers 114 and the multiplexer 116. The multiplexer 116 is used for arranging the traffic and control channels used by several transceivers 114 on one transmission connection 160.

From the transceivers 114 of the base station B there is a connection to an antenna unit 112, which establishes a bidirectional radio connection Uu to the subscriber terminal 150. The structure of the frames to be transmitted on the bidirectional radio connection Uu is strictly defined.

The base station controller RNC comprises a switching field 120 and a control unit 124. The switching field 120 is used for switching speech and data and for connecting signaling circuits. A base station system formed by the base station B and the base station controller RNC also includes a transcoder 122. The division of tasks between the base station controller RNC and the base station B and the physical structure may vary according to the application. Typically the base station B implements the radio path as described above. The base station controller RNC is typically responsible for the following: radio resource management, handover control, power control, timing, synchronization and paging of a subscriber terminal.

The transcoder 122 is usually located as close to a mobile services switching center 132 as possible because this saves transmission capacity when speech is transmitted in the format of a cellular radio network between the transcoder 122 and the base station controller RNC. The transcoder 122 converts the different digital speech encoding formats used between the public switched telephone network and the radio telephone network into a compatible format, e.g. from the 64 kbits/s format of the fixed network into a format of the cellular radio network (e.g. 13 kbit/s), and vice versa. The devices needed are not described in greater detail here, but it should be noted that other data than speech are not converted in the transcoder 122. The control unit 124 is responsible for call controlling, mobility management, collection of statistics and signaling.

The core network CN consists of infrastructure belonging to a mobile communications system external to the UTRAN. FIG. 1B illustrates a mobile services switching center 132, which is one of the devices belonging to circuit-switched transmission of the core network CN.

As is seen in FIG. 1B, the switching field 120 can establish connections (illustrated with black dots) both to a public switched telephone network PSTN 134 via the mobile services switching center 132 and to a packet transmission network 142. In the public switched telephone network 134 a typical terminal 136 is a conventional telephone or an ISDN telephone (Integrated Services Digital Network). Packet transmission is performed from a computer 148 connected to the mobile communication system via the Internet 146 to a portable computer 152 connected to the subscriber terminal 150. A WAP phone (Wireless Application Protocol) can also be used instead of the combination of the subscriber terminal 150 and the portable computer 152.

The connection between the packet transmission network 142 and the switching field 120 is established by a support node 140 (SGSN=Serving GPRS Support Node). The function of the support node 140 is to transmit packets between the base station system and a gateway node (GGSN=Gateway GPRS Support Node) 144 and keep a record of the location of the subscriber terminal 150 in its area.

The gateway node 144 connects a public packet transmission network 146 and the packet transmission network 142. An Internet protocol or an X.25 protocol can be used at the interface. The gateway node 144 hides the internal structure of the packet transmission network 142 from the public packet transmission network 146 by encapsulating the structure, and thus the public packet transmission network 146 regards the packet transmission network 142 as a sub-network which comprises a subscriber terminal 150 to which the public packet transmission can send packets and receive packets from it.

The packet transmission network 142 is typically a private network which utilizes the Internet protocol and carries signaling and user data. The structure of the network 142 may vary according to the operator in respect of its architecture and protocols below the Internet protocol layer.

The public packet transmission network 146 may be e.g. the worldwide Internet network, there being a terminal 148, e.g. a server computer, connected to the Internet which wants to transmit packets to the subscriber terminal 150.

Figure 1C:
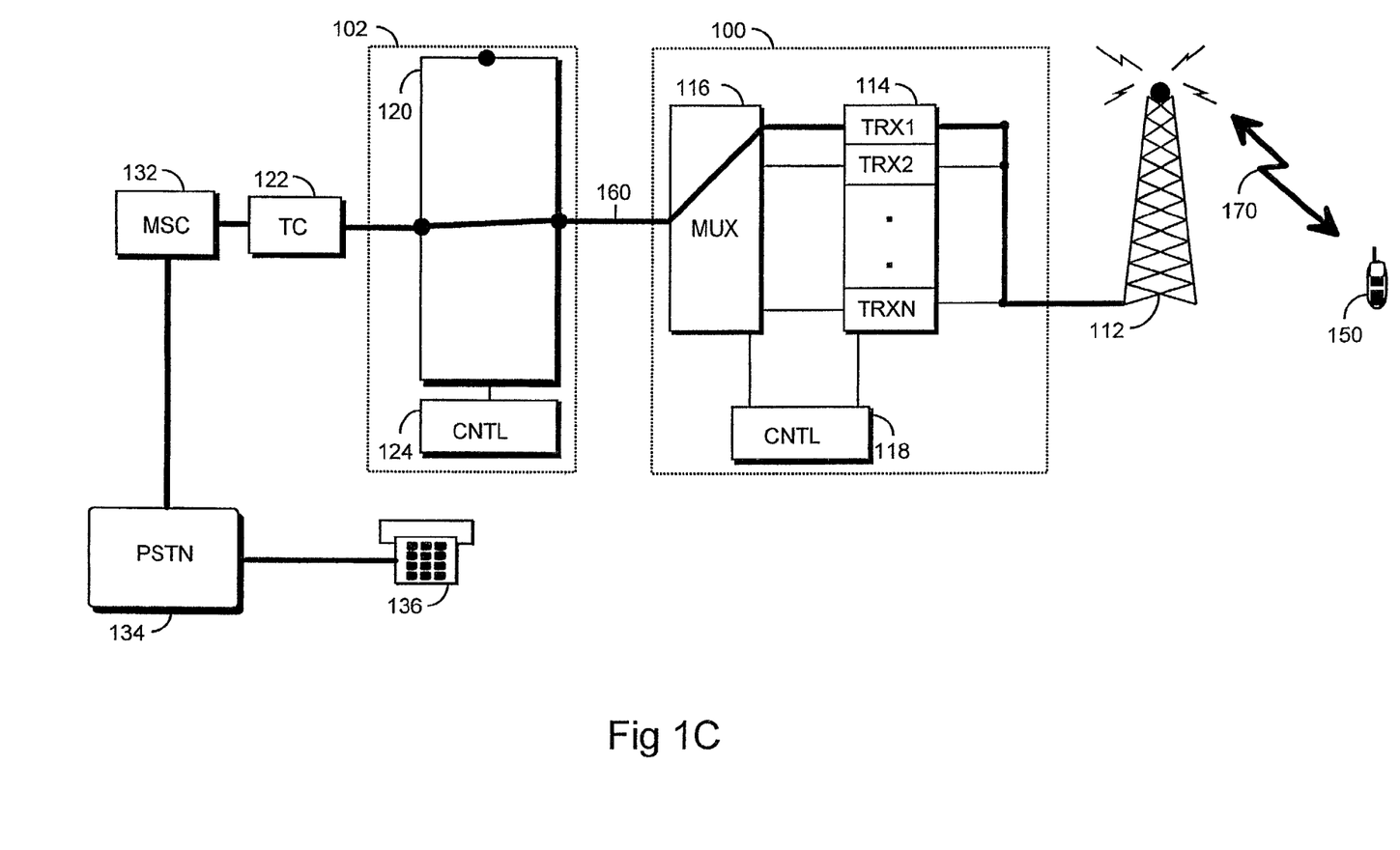
FIG. 1C illustrates a circuit-switched connection.

FIG. 1C illustrates how a circuit-switched connection is established between the subscriber terminal 150 and the terminal 136 of the public switched telephone network. The bold line in the figures illustrates how data passes through the system at the air interface 170 from the antenna 112 to the transceiver 114 and from the transceiver in a form multiplexed in the multiplexer 116 over a transmission connection 160 to the switching field 120, where a connection is established to the output towards the transcoder 122, and further to the terminal 136 connected to the public switched telephone network 134 through switching performed at the mobile services switching center 132. In the base station 100 the control unit 118 controls the multiplexer 116 in performing of transmission, and in the base station controller 102 the control unit 124 controls the switching field 120 in performing of correct switching.

Figure 1D:
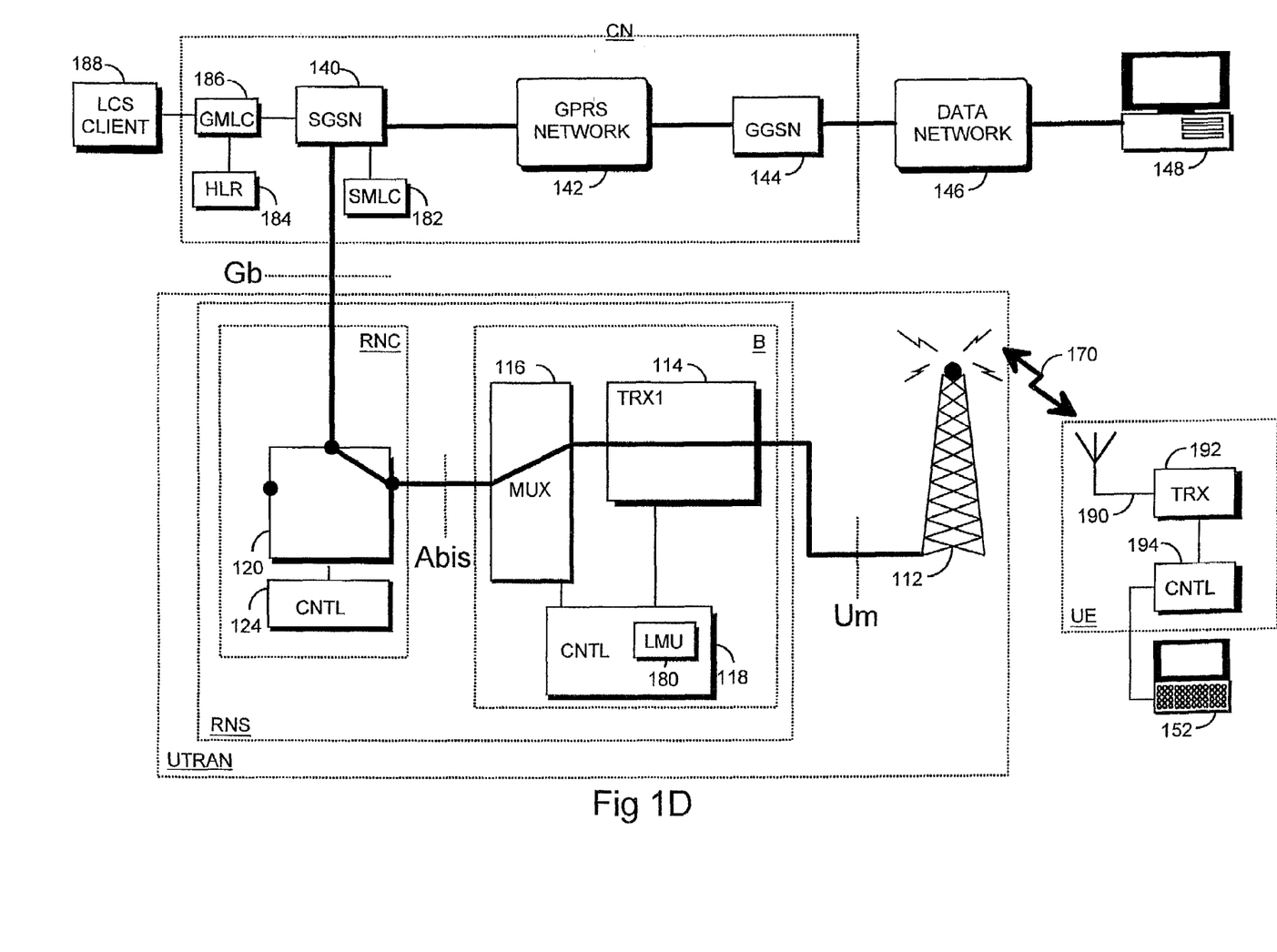
FIG. 1D illustrates a packet-switched connection.

FIG. 1D illustrates a packet-switched transmission connection. A portable computer 152 is connected to the subscriber terminal 150. The bold line describes how the data to be transmitted is carried from the server computer 148 to the portable computer 152. Information can naturally also be transmitted in the opposite transmission direction, that is, from the portable computer 152 to the server computer 148. Data passes through the system at the air interface, i.e. at the Um interface 170, from the antenna 112 to the transceiver 114 and from the transceiver in a form multiplexed in the multiplexer 116 over a transmission connection 160 at the Abis interface to the switching field 120, where a connection is established to the output towards the support node 140 at the Gb interface. From the support node 140 the data is transmitted along the packet transmission network 142 via the gateway node 144 to the server computer 148 connected to the public packet transmission network 146.

For the sake of clarity FIGS. 1C and 1D do not illustrate a case in which both circuit-switched and packet-switched data are transmitted at the same time. This is, however, feasible as well as common since capacity freed from transmission of circuit-switched data can be flexibly used for packet-switched transmission. It is also possible to build a network on which only packet-switched data is transmitted, i.e. no circuit-switched data. In that case the network structure can be simplified.

We will now return to FIG. 1D. The different entities of the UMTS system, i.e. CN, UTRAN, RNS, RNC, B, are illustrated with broken line boxes in the figure. Devices of the core network CN that belong to packet-switched transmission will also be described in greater detail. In addition to the support node 140, packet transmission network 142 and gateway node 144, the core network comprises a gateway mobile location center GMLC 186 and a home location register HLR 184. The function of the gateway mobile location center is to offer the requested service to an outside client 188 of the location service. The home location register 184 includes subscriber data of the location service and routing information.

FIG. 1D shows a serving mobile location center 182, which is one of the devices needed by the location service and may be located, as shown, in the base station controller RNC, e.g. in its control part 124, or which may be a separate device connected either to the base station controller RNC or to the support node 140. The figure also shows a location measurement unit LMU 180, which may be in the base station B, e.g. in its control part 118, or which may be a separate device connected to the base station B. The function of the location measurement unit 180 is to perform any radio measurements needed in the location method.

FIG. 1D also shows those structural parts of the subscriber terminal UE that are relevant to the present embodiment. The subscriber terminal UE comprises an antenna 190, via which a transceiver 192 receives a signal from the radio path 170. The function of the subscriber terminal UE is controlled by a control part 194, which is typically a microprocessor provided with the necessary software. The protocol procedures to be described later are also performed by this software. In addition to the above-mentioned parts, the subscriber terminal UE comprises a user interface, which typically consists of a loudspeaker, microphone, screen and keyboard, and a battery. These are not described more closely because they are irrelevant to the present invention.

Neither the structure of the transceiver in the base station B nor the structure of the transceiver in the subscriber terminal UE is described more closely because it is clear to a person skilled in the art how these devices are implemented. For example, a normal radio network transceiver and a subscriber terminal transceiver in accordance with the EGPRS can be used. The only thing that is important to the present embodiment is that the radio connection 170 can be implemented, since the function required by the application is performed at upper levels of the OSI model (Open Systems Interconnection), particularly in the third layer.

Figure 2:
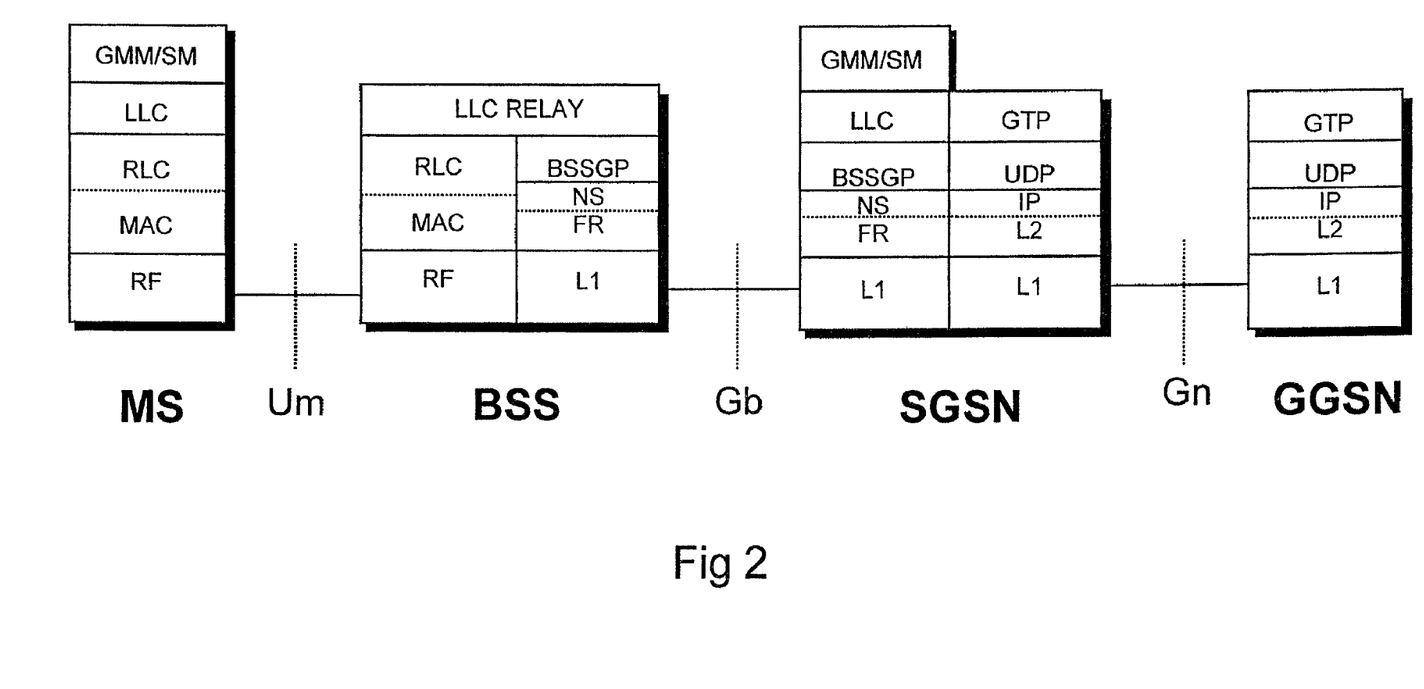
FIG. 2 shows an example of protocol stacks used in certain parts of the cellular radio network.

FIG. 2 illustrates control plane protocol stacks of the EGPRS. It should be noted that the embodiments are not limited to the EGPRS. The protocol stacks have been formed according to the OSI model (Open Systems Interconnection) of the ISO (International Standardization Organization). In the OSI model protocol stacks are divided into layers. In principle, there may be seven layers. FIG. 2 shows which protocol sections are processed in each network element. The network elements illustrated in the figure are a subscriber terminal MS, a base station system BSS, a support node SGSN and a gateway node GGSN. The base station and the base station controller are not illustrated separately because an interface has not been defined between them. In principle, the protocol handling defined for the base station system BSS can be divided freely between the base station 100 and the base station controller 102, but in practice not between the transcoder 122, even though it belongs to the base station system BSS. Different network elements are separated by interfaces Um, Gb and Gn between them.

The layer in each device MS, BSS, SGSN, GGSN communicates logically with a layer in another device. Only the lowest physical layers communicate directly with one another. The other layers always use the services provided by the next lower layer. Thus a message has to physically travel in the vertical direction between the layers, and only in the lowest layer the message travels in the horizontal direction between the layers.

The actual bit-level data are always transmitted using the first physical layer RF, L1. The mechanical, electric and functional properties needed to access a physical transmission path are defined in the physical layer. The second layer, i.e. the data link layer, uses the services of the physical layer to provide reliable data transmission, and corrects e.g. transmission errors. At the air interface 170 the data link layer is divided into an RLC/MAC sub-layer and an LLC sub-layer. The third layer, i.e. the network layer, provides the upper layers with independence from data transmission and switching techniques, which are used for establishing a connection between the devices. The network layer is responsible for establishment, maintenance and release of a connection, for example. In the GSM the network layer is also called a signaling layer. It has two main functions: it routes messages and enables several independent connections between two entities at the same time.

The network layer comprises a session management SM sub-layer and a GPRS mobility management GMM sub-layer.

The mobility management sub-layer GMM takes the consequences that result from the fact that the user of the subscriber terminal moves and are not directly related to the management of radio resources. In the fixed network this sub-layer would check the user's rights and connect the user to the network. In cellular radio networks this sub-layer thus supports user mobility, registration and management of mobility data. This sub-layer also checks the identity of the subscriber terminal and the identities of allowed services. In this sub-layer messages are transmitted between the subscriber terminal MS and the support node SGSN.

The session management sub-layer SM manages all functions related to the management of a packet-switched call but it does not detect user mobility. The session management sub-layer SM establishes, maintains and releases connections. It has separate procedures for calls originating from the subscriber terminal 150 and for calls terminating to the subscriber terminal. In this sub-layer messages are also transmitted between the subscriber terminal MS and the support node SGSN.

In the base station system BSS the messages of the session management sub-layer SM and the mobility management sub-layer GMM are processed transparently, i.e. they are only transferred to and fro.

The LLC layer (Logical Link Control) provides a reliable logical encryption link between the SGSN and the MS. The LLC is independent of the lower layers, which allows to minimize the effect of changes in the air interface on the network part of the mobile communications network. The information to be transmitted and the user data are encrypted. Between the Um and the Gb interfaces the LLC data is transmitted at the relaying level LLC RELAY of the LLC.

The MAC level (Medium Access Control) is responsible for the following tasks: multiplexing of data and signaling both in the uplink (from the subscriber terminal towards the network part) and in the downlink (from the networks part towards the subscriber terminal), management of resource requests in the uplink and allocation of resources and timing of traffic in the downlink. Management of traffic prioritization also belongs to this level. The RLC level (Radio Link Control) transmits data of the LLC level, i.e. LLC frames, to the MAC level; the RLC splits the LLC frames into RLC data blocks, which it transmits to the MAC layer. In the uplink direction the RLC forms LLC frames from the RLC data blocks and transmits them to the LLC layer. The physical level is implemented with a radio connection at the Um interface, e.g. at the air interface defined for the GSM. At the physical level the following tasks, for example, are performed: modulation of the carrier wave, interleaving and error correction of the data to be transmitted, synchronization, and power control of the transmitter.

The GPRS tunneling protocol GTP tunnels the signaling along the trunk network between different SGSNs and GGSNs. If desired, the GTP can control the flow between the SGSN and the GGSN.

The user datagram protocol UDP transmits the GTP layer data packets whose protocol does not require a reliable link, e.g. when the Internet protocol IP is used. At the user level a TCP (Transmission Control Protocol) could also be used, which controls the flow of the packets transmitted via it and protects them against disappearance and corruption. The UPD protects the packets only against corruption.

The IP is a trunk network protocol of the GPRS, which routes user data and control data. The IP may be based on the IPv4 protocol, but in a later phase this will be replaced with the Ipv6 protocol.

In addition to the upper level data, the BSSGP plane (Base Station Subsystem GPRS Protocol) carries information on routing and quality of service between the BSS and the SGSN. This information is physically carried by the FR level (Frame Relay). The NS (Network Service) transmits the messages in accordance with the BSSGP protocol.

Figure 3:
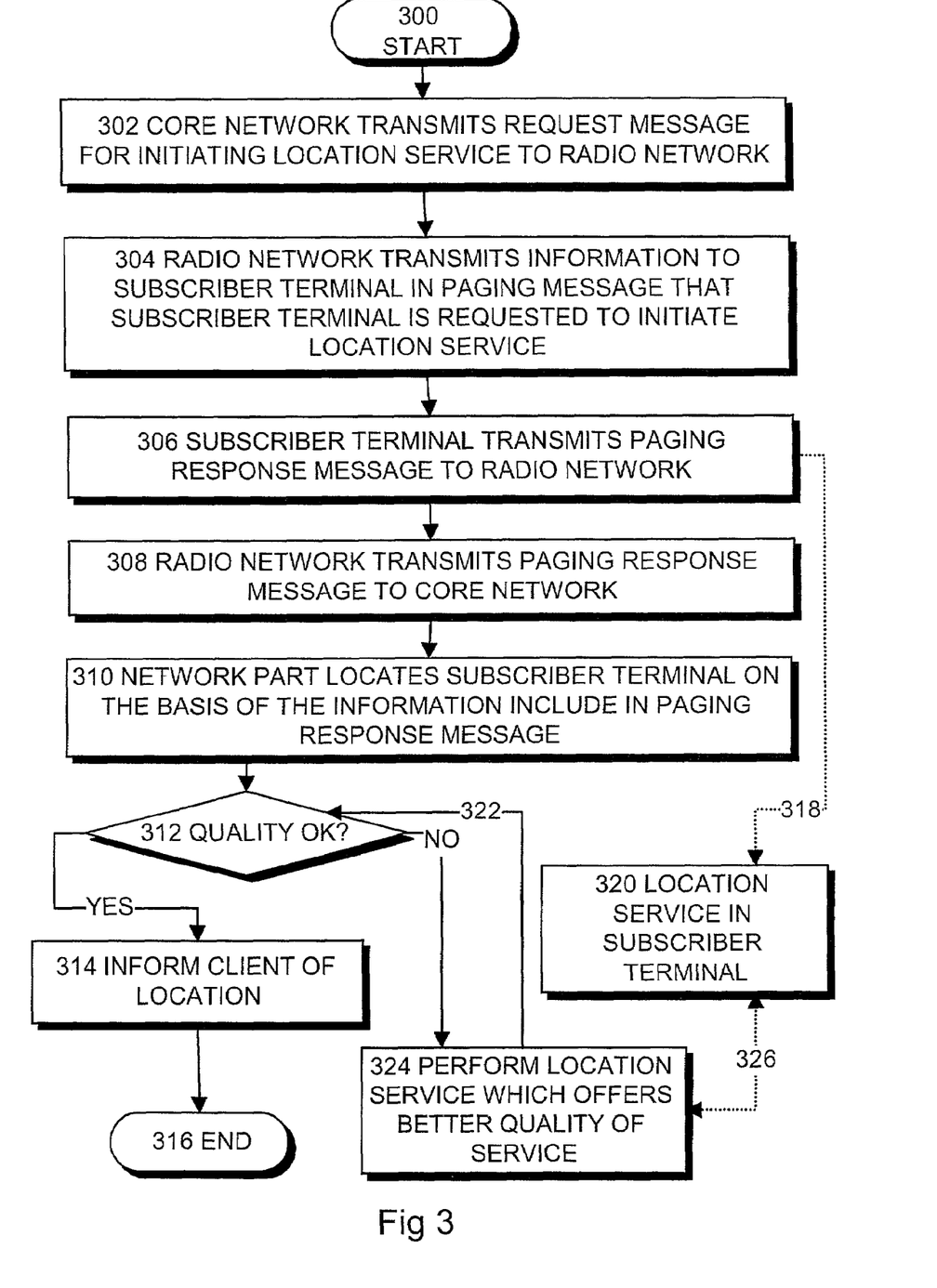
FIG. 3 is a flow chart illustrating functions to be performed in the location method.
Figure 4:
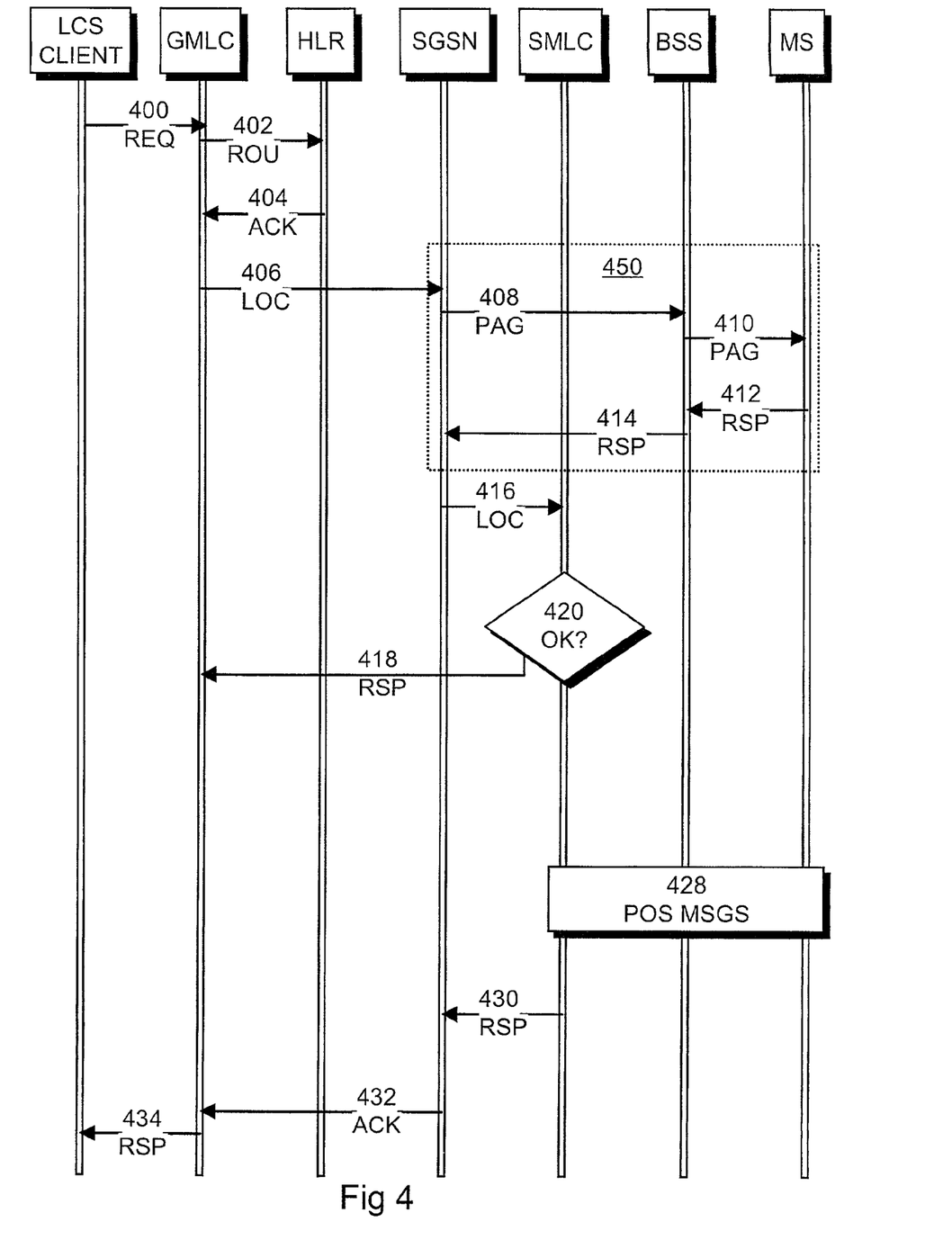
FIG. 4 is a signal sequence chart illustrating the signaling to be carried out in the location method.

In the following, an example of how the subscriber terminal location method functions and how it can be employed will be described with reference to FIGS. 3 and 4. FIG. 3 is a flow chart illustrating functions to be performed in the location method, and FIG. 4 is a signal sequence chart illustrating the signaling to be carried out in the location method.

An outside client LCS_CLIENT of the location service requests information on the location of a subscriber terminal by sending a location service request 400 to the GMLC. The GMLC transmits a routing information request 402 to the HLR: The HLR responds to the routing information request 402 with a routing information acknowledgement 404.

On the basis of the routing information the GMLC finds out the correct SGSN to which a request 406 for obtaining the location of the subscriber terminal is transmitted. As a result of this, the core network of the radio system, i.e. the SGSN in our example, transmits a request message 406 to the radio network of the radio system, i.e. the BSS in our message, in block 302.

Next in block 304 the radio network BSS transmits information in a paging message 408 to the subscriber terminal MS that the subscriber terminal MS is requested to initiate the location service. The paging message may also contain a cause code for transmitting the message. Furthermore, the paging message may include other information on the location service, e.g. technology-dependent parameters and service-dependent parameters. In that case the BSSGP PS paging message used in the GPRS or the RANAP paging message used in the UMTS has to be modified.

In block 306 the subscriber terminal MS that received the paging message 408 transmits a paging response message 412 to the radio network BSS. The information included in the paging response message may comprise identity of the serving cell, and/or timing information on the radio connection, and/or other information on the radio system or on the subscriber terminal. The timing information includes a timing advance factor or the round trip time. The other information that can be used includes at least one of the following parameters: receiving power of the serving cell, receiving power of at least one neighboring cell, charge level of the battery in the subscriber terminal, information on the conditions at the location of the subscriber terminal, such as the temperature or information on a previous location of the subscriber terminal, if available. For example, the LLC frame normally used in the GPRS can be replaced with a new message of the second layer or with a message of the RLC/MAC layer. A corresponding change can also be made in the UMTS.

At least part of the information included in the paging response message received by the core network may have been inserted into the paging response message by the subscriber terminal. Furthermore, at least part of the information included in the paging response message received by the core network may have been inserted into the paging response message by the radio network.

According to arrow 318, block 306 triggers block 320, in which the subscriber terminal, having received the paging message, initiates the functions required by the location service. These functions are naturally dependent on the radio system used and on the properties of the subscriber terminal. The functions required by the location service include reception of signals in the subscriber terminal, and measurement of the signals or transmission of signals from the subscriber terminal. For implementation of the location service, the signals to be received in the subscriber terminal also comprise signals transmitted by other base stations of the radio system than by that of the serving cell, or the signals transmitted by a satellite of the GPS system.

Having transmitted a paging response message, the subscriber terminal can continue performance of the functions required by the location service, but it has to be prepared for a request for location with a better quality after a while.

In block 308 the radio network BSS transmits a paging response message 414 to the SGSN of the network part. The information relevant to the location service obtained from the paging response message is transmitted to the SMLC in a message 416. The actual location is performed in the SMLC according to block 310 so that the network part locates the subscriber terminal on the basis of the information included in the paging response message, e.g. on the basis of the timing information used on the radio connection and the cell identity.

According to block 312, the network part, i.e. function 420 in the SMLC in our example, checks whether the location of the subscriber terminal carried out corresponds to the target set for the quality of service. If the target set for the quality of service is not achieved, i.e. location is too inaccurate or poor, we will move to block 423, where the network part performs a location service which provides a better quality of service. If the target set for the quality of service set is achieved, we will move submit the location information obtained to the GMLC in message 418 and move to block 314, where the location of the subscriber terminal in submitted to the one who ordered it. In FIG. 4 this is carried out by transmitting a location service response message 434 from the GMLC to the client LCS CLIENT of the location service.

Initiation of the location service in the subscriber terminal according to block 320 may further performance of the location service that provides a better quality of service in block 324. According to block 428, the communication needed is performed using a packet-switched connection between the SMLC, the BSS and the MS so that the location service with a better quality can be performed. The content of the message concerned naturally depends on the location method used. The location methods described at the beginning can be used, depending on which is supported by the radio system and the subscriber terminal. Thus there is cooperation between blocks 320 and 324 in accordance with arrow 326.

After the location with a better quality has been performed, we move from block 324 to block 312 according to arrow 322, where the quality of service is tested again. In principle, the quality of the location service can be improved with several iteration cycles, if necessary. In the example of FIG. 4 it is assumed that the quality of service is sufficient, i.e. the SMLC transmits the location information 430 to the SGSN, which forwards 432 the location information to the GMLC, and thus the client LCS CLIENT of the location service can be informed of the subscriber terminal location using a response message 434.

A kind of main point of the example described is illustrated with a rectangular area 450 shown with broken lines. This area illustrates processing of the paging message and the paging response message. In a preferred embodiment the paging message is transmitted even though the subscriber terminal would already be on standby due to a paging message received earlier. This provides the advantage that use of a packet-switched connection is not necessary, and consequently the service can be performed faster. The paging message and the paging response message are messages of protocol layers that correspond to the second or the third layer of the OSI model.

Compared to the prior art, the new features are implemented preferably by software, and thus the location method requires relatively simple software changes to precisely defined functions in the core network, radio network and subscriber terminal. The network part of the radio system comprises means 182, 186 for transmitting a location service request message to the radio network RAN. The radio network RAN comprises paging means 118, 124 for transmitting information to the subscriber terminal UE in a paging message that the subscriber terminal UE is requested to initiate the location service. The subscriber terminal UE comprises means 194 for transmitting a paging response message to the radio network RAN after it has received the paging message. The radio network RAN comprises means 180 for transmitting the paging response message to the network part. The network part of the radio system comprises means 182, 186 for locating the subscriber terminal UE on the basis of the information included in the paging response message. These means can also be implemented as software to be performed in a general-purpose processor, for example. The invention can also be implemented by hardware, e.g. as an ASIC (Application Specific Integrated Circuit) or as control logic consisting of separate components.

Even though the invention has bee described with reference to the example according to the accompanying drawings, it is clear that the invention is not limited thereto but may be modified in various ways within the inventive concept disclosed in the appended claims.

The invention claimed is:

1. A method of locating a subscriber terminal in a packet-switched radio system, comprising:

the core network of the radio system transmitting a location service request message to the radio network of the radio system;

the radio network transmitting information to the subscriber terminal in a paging message that the subscriber terminal is requested to initiate the location service;

the subscriber terminal that received the paging message transmitting a paging response message to the radio network;

the radio network transmitting the paging response message to the core network; and locating the subscriber terminal on the basis of the information included in the paging response message, wherein said information comprises identity of a serving cell and other information comprising at least one of complete location estimate, cellular interface signal strength measurements, a timing advance factor or the round trip time, and measurements based on sources unrelated to a radio connection.

2. A method according to claim 1, wherein the information further comprises at least one of the following parameters: receiving power of the serving cell, receiving power of at least one neighboring cell, charge level of the battery in the subscriber terminal, information on the conditions at the location of the subscriber terminal, information on a previous location of the subscriber terminal.

3. A method according to claim 1, wherein at least part of the information included in the paging response message received by the core network has been inserted into the paging response message by the subscriber terminal.

4. A method according to claim 1, wherein at least part of the information included in the paging response message received by the core network has been inserted into the paging response message by the radio network.

5. A method according to claim 1, wherein the subscriber terminal initiates the location service after it has received the paging message.

6. A method according to claim 5, wherein the functions required by the location service comprise receiving signals in the subscriber terminal and measuring them, or transmitting signals from the subscriber terminal.

7. A method according to claim 6, wherein the signals received in the subscriber terminal for implementing the location service comprise signals transmitted by the radio system, including signals transmitted by other base stations of the radio system than by that of the serving cell, or the signals transmitted by a satellite of the GPS system.

8. A method according to claim 5, wherein the subscriber terminal continues performance of the functions required by the location service after it has transmitted the paging response message.

9. A method according to claim 1, wherein the network part checks whether the location of the subscriber terminal carried out corresponds to a target set for the quality of service.

10. A method according to claim 9, wherein, if the target set for the quality of service is not achieved, the network part will perform a location service which offers a better quality of service.

11. A method according to claim 1, wherein the paging message is transmitted even though the subscriber terminal would already be on standby due to a paging message received earlier.

12. A method according to claim 1, wherein the paging message and the paging response message are messages of protocol layers that correspond to the third layer of the OSI model.

13. The method according to claim 1, wherein the paging message further includes a cause code indicative of the reason for which the subscriber terminal is being located.

14. A packet-switched radio system comprising:
a network part of the radio system, which comprises a core network, and a radio network connected to the core network;
a radio connection from the radio network to a subscriber terminal;
the network part comprising location service means for locating the subscriber terminal;
the network part comprises means for transmitting a location service request message to the radio network;
the radio network comprises paging means for transmitting information to the subscriber terminal in a paging message that the subscriber terminal is requested to initiate the location service;
the subscriber terminal comprises means for transmitting a paging response message to the radio network after it has received the paging message;
the radio network comprises means for transmitting the paging response message to the core network; and
the network part of the radio system comprises means for locating the subscriber terminal on the basis of the information included in the paging response message, wherein said information comprises identity of a serving cell and other information comprises at least one of: complete location estimate, cellular interface signal strength measurements, a timing advance factor or the round trip time, and measurements based on sources unrelated to a radio connection.

15. A radio system according to claim 14, wherein the other information comprises at least one of the following parameters: receiving power of the serving cell, receiving power of at least one neighboring cell, charge level of the battery in the subscriber terminal, information on the conditions at the location of the subscriber terminal, information on a previous location of the subscriber terminal.

16. A radio system according to claim 14, wherein the subscriber terminal comprises means for inserting at least part of the information, included in the paging response message received by the core network, has been inserted into the paging response message by the subscriber terminal.

17. A radio system according to claim 14, wherein the subscriber terminal comprises means for inserting at least part of the information included in the paging response message received by the core network has been into the paging response message by the radio network.

18. A radio system according to claim 14, wherein the subscriber terminal comprises means for initiating the location service after it has received the paging message.

19. A radio system according to claim 18, wherein the functions required by the location service comprise receiving signals in the subscriber terminal and measuring them, or transmitting signals from the subscriber terminal.

20. A radio system according to claim 19, wherein the signals received in the subscriber terminal for implementing the location service comprise signals transmitted by the radio system, including signals transmitted by other base stations of the radio system than by that of the serving cell, or the signals transmitted by a satellite of the GPS system.

21. A radio system according to claim 18, wherein the subscriber terminal comprises means for continuing the functions required by the location service after it has transmitted the paging response message.

22. A radio system according to claim 14, wherein the network part comprises means for checking whether the location of the subscriber terminal carried out corresponds to a target set for the quality of service.

23. A radio system according to claim 22, wherein, if the target set for the quality of service is not achieved, the network part comprises means for performing a location service which offers a better quality of service.

24. A radio system according to claim 14, wherein the paging means transmit a paging message even though the subscriber terminal would already be on standby due to a paging message received earlier.

25. A radio system according to claim 14, wherein the paging message and the paging response message are messages of protocol layers that correspond to the third layer of the OSI model.

26. The radio system according to claim 14, wherein the paging message further includes a cause code indicative of the reason for which the subscriber terminal is being located.

* * * * *